2,788,950
SPRING CLIP PAIL ATTACHMENT MEANS

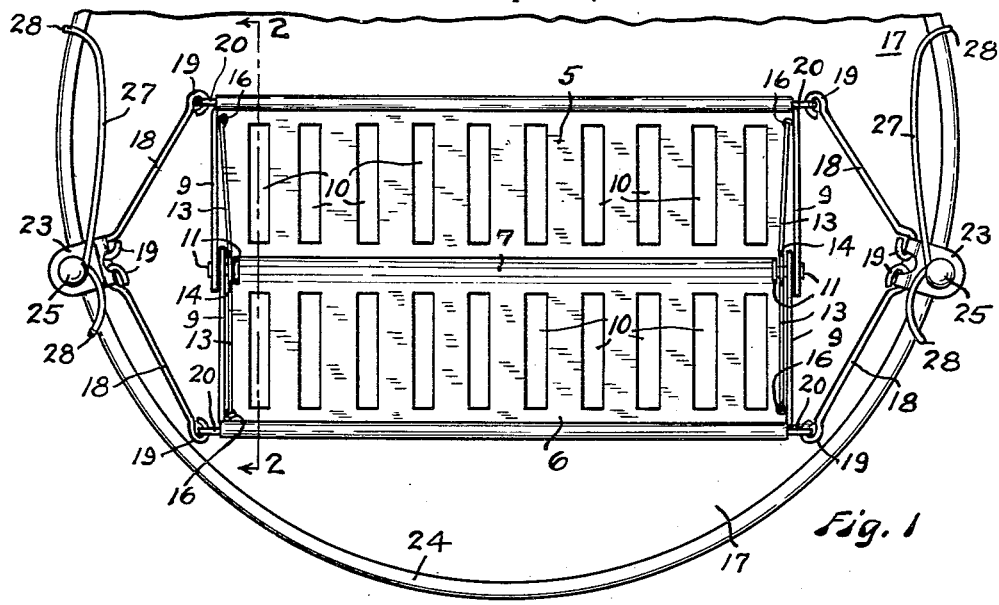
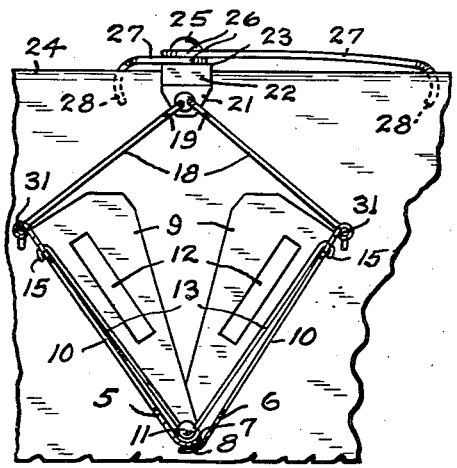
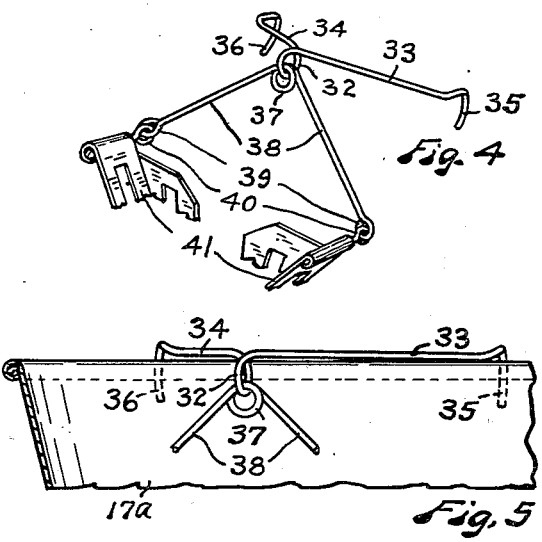
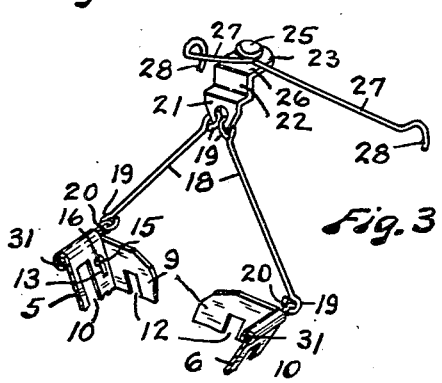
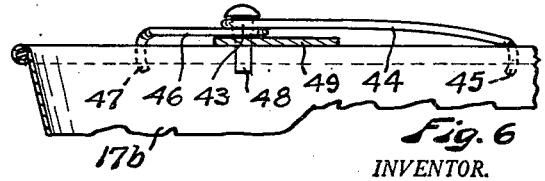
April 16, 1957    D. JENKINS    2,788,950
SPRING CLIP PAIL ATTACHMENT MEANS
Filed Sept. 10, 1952
INVENTOR.
David Jenkins
BY
Fred C. Matheny
ATTORNEY

United States Patent Office 2,788,950
Patented Apr. 16, 1957

David Jenkins, Seattle, Wash.

Application September 10, 1952, Serial No. 308,834

1 Claim. (Cl. 248—226)

This invention relates to a spring clip for attaching an article, such as a mop wringing device to a pail and this application is made pursuant to a requirement for division and is a continuation in part of my prior application Serial Number 10,970, filed Feb. 26, 1948, upon which Patent No. 2,610,348 issued on September 16, 1952.

An object of this invention is to provide a spring clip of novel and efficient construction which is particularly well adapted for use in suspending an article within a pail or in connecting an article with the top portion of a pail and which is readily applicable to pails of different sizes.

Other objects of the invention are to provide a spring clip which is quickly and easily manipulated in attaching it to and detaching it from a pail and one which will grip the pail firmly and hold the article efficiently and one which is permanently attached to the article it supports and can not be misplaced or lost.

Other objects are to provide a spring clip which is simple and durable in construction, reliable and efficient in operation, and one which is not expensive to manufacture.

Other objects of the invention will be apparent from the following description taken in connection with the accompanying drawings.

In the drawings Figure 1 is a top plan view showing a mop wringer suspended in a mop pail by attachment means constructed in accordance with this invention, a portion of the pail being broken away.

Fig. 2 is a view partly in section and partly in elevation looking in the direction of broken line 2—2 of Fig. 1.

Fig. 3 is a fragmentary perspective view of one end portion of a mop wringer showing this spring clip suspension means attached thereto.

Fig. 4 is a fragmentary perspective view similar to Fig. 3 but showing a spring clip and mop wringer suspension means of modified form.

Fig. 5 is a fragmentary view partly in section and partly in elevation showing the clip and suspension means illustrated in Fig. 4 as it may appear when attached to a pail.

Fig. 6 is a fragmentary view partly in section and partly in elevation illustrating a pail attachment spring clip of the type shown in Fig. 3 used in connection with a flat member which rests on and extends across the top of a pail, a fragment of the pail being shown.

Like reference numerals designate like parts throughout the several views.

The mop wringer herein illustrated comprises two rectangular plates 5 and 6 having adjoining interfitting curved edge portions 7 and 8 respectively and having four end members 9 of generally triangular shape. Preferably the plates 5 and 6 are formed of sheet metal and have drainage perforations, such as slots 10 therein. Also slots 12 may be provided in the end members 9.

The end members 9 are arranged to overlap each other and the two plates 5 and 6 are connected by pivot members 11 which extend through the end members 9 adjacent the curved edges 7 and 8. This pivotally connects the two plates 5 and 6 with each other for relative angular movement on an axis parallel to the adjoining curved edge portions 7 and 8 of said plates.

Preferably spring means is provided to urge the two plates 5 and 6 into a spread apart position. This spring means can be in the form of two spring wires 13 each having a medial loop portion 14 anchored on one of the pivot members 11 and each having two outwardly bent end portions 15 which fit into holes 16 in the end members 9 of the respective plates 5 and 6. The pivot members 11 preferably are shouldered rivets which are long enough to function as anchor means for the loop portions 14 of the springs 13. The top edge portion of each plate 5 and 6 is preferably rolled or bent around a reinforcing wire 31 to give added strength and finish and to provide eye members 20 at the ends for connection with suspension means.

The suspension means for suspending this mop squeezing device or wringer within a mop pail 17 comprises two pairs of relatively inclined links 18 having at their lower ends eye members 19 connected with the eye members 20 at the uppermost corners of the plates 5 and 6. Each link 18 also has an eye member 19 at the upper end thereof which is connected with a mop pail engaging bracket, one such bracket being provided for supporting the two links 18 of each pair. Each mop pail engaging bracket comprises a perforated lobe 21 with which two of the links 18 engage, a normally upright portion 22 adapted to engage with the inner side of a pail 17 and a normally horizontal portion 23 adapted to rest on the top rim 24 of the pail 17. Each rim engaging portion 23 is provided with a fixedly secured upwardly extending member 25, such as a rivet, on which a loop 26 of a pail engaging spring clip 27 is supported. Each spring clip 27 has two arms preferably of unequal length which extend in opposite directions from the loop 26 and are approximately parallel to the rim engaging portions 23 of the mop pail engaging bracket. Each arm of each clip 27 terminates in a hook shaped portion 28 which is adapted to hook over the top rim 24 of the pail 17. The longer arm of each spring clip 27 is sufficiently resilient so that it can be flexed manually and engaged with or disengaged from the rim 24 of the pail. The shorter arm of each spring clip 27 has more stiffness, because of its short length and cooperates to firmly hold the bracket 21, 22, 23 on the pail. The part 22 of the bracket member engages within and presses against the inside of the pail and serves as a fulcrum against which the spring arms react to firmly anchor the clip to the pail.

The spring clip shown in Figs. 4 and 5 is similar to the spring clip shown in Figs. 1 to 3 in that it is formed of a single piece of spring wire having an intermediate loop 32 dividing the same into a longer spring arm 33 and a shorter spring arm 34. The arms 33 and 34 terminate respectively in hook shaped pail engaging end portions 35 and 36 which extend sidewise and downwardly therefrom, as respects the showing of these parts in Figs. 4 and 5, and are curved to hook over the rim of a pail 17a. The loop 32 in Figs. 4 and 5 extends in a different direction from the spring arms 33 and 34 than does the corresponding loop 26 in Figs. 2 and 3 so that said loop 33 will extend downwardly into a pail 17a to which it is applied and will serve as a spring loop and as a pail engaging fulcrum member cooperating to cause the spring arms to grip the pail and as a suspension member for parts supported within the pail.

The loop 32, Figs. 4 and 5, is connected with a spring loop 37 of a spring wire suspension member 38 of inverted V shape. The spring wire suspension member 38 has end loops 39, each of which is pivotally connected with a loop 40 of a mop wringer 41. The mop wringer 41 is similar to the mop wringer shown in Figs. 1, 2 and 3 except that the springs 13, shown in Figs. 1, 2 and 3 are omitted and each spring wire suspension member 38 performs the same function as the springs 13 in that it yieldingly urges the two side plates of the mop wringer 41 into spread apart relation.

The spring clip shown in Figs. 4 and 5 engages with the top of a pail 17a in a manner similar to the clip 27 of Figs. 1 to 3. The arms 33 and 34 rest on the top edge of the pail 17a, the loop 32 functions as a pail engaging member and fulcrum within the pail and hook shaped end parts 36 and 35 hook over the rim portion of the pail. This clip is easy to apply to a pail and it engages the pail firmly and holds the mop wringer 41 securely but is easily manually disengaged from the pail.

Fig. 6 shows a pail engaging spring clip similar to the clip shown in Figs. 1, 2 and 3. This clip comprises an intermediate spring loop 43, a longer spring arm 44 terminating in a hook shaped end portion 45 to engage a pail 17b and a shorter spring arm 46 terminating in a pail engaging hook shaped end portion 47. The spring loop 43 is pivotally mounted on a rivet 48 of a bar or plate 49 which rests on and extends across the top of the pail 17b. The plate 49 may be of a type adapted to have a paint brush drawn across it to remove excess paint from the brush or it may be used for other purposes. The rivet 48 extends below the plate 49 and engages with the inside of the pail 17b and functions as a fulcrum member against which the resilient force of the spring arms 44 and 46 reacts when the clips are in proper position on a pail.

The foregoing description and accompanying drawings clearly disclose a preferred embodiment of this invention but it will be understood that this disclosure is merely illustrative and that changes may be made within the scope and spirit of the following claim.

I claim:

In a pail attachment device, a flat metal bracket having a pail engaging part and having a clip supporting part connected with one edge portion of said pail engaging part and extending substantially at right angles from said pail engaging part and having an article supporting part connected with an opposite edge portion of said pail engaging part and offset transversely from the plane of said pail engaging part in an opposite direction from said clip supporting part, whereby when said device is applied to a pail said clip supporting part rests on the top edge of the pail and said pail engaging part extends into and engages the inside wall of the pail and said article supporting part extends downwardly in the pail clear of the inside wall of the pail; a pivot member rigid with the clip supporting part of said bracket and extending upwardly therefrom; a spring wire clip having a resilient pivot loop intermediate its two ends but nearer to one end than the other dividing said clip into a relatively stiff shorter arm and a relatively resilient longer arm, said clip extending across the top of said bracket and said resilient pivot loop being fulcrumed on said pivot member; and a pail engaging hook on the outer end of each of said arms extending generally transversely from the arm toward the side at which the bracket is disposed and concavely curved toward the bracket, the longer relatively resilient arm of said spring clip facilitating manual attachment and detachment of the pail attachment device relative to a pail and the shorter relatively stiff arm of said spring clip securely binding the pail attachment device to the pail.

References Cited in the file of this patent

UNITED STATES PATENTS

| | | |
|---|---|---|
| 445,876 | Brown | Feb. 3, 1891 |
| 979,945 | Harnischfeger | Dec. 27, 1910 |
| 1,105,083 | Lamb | July 28, 1914 |
| 1,204,133 | Coll | Nov. 7, 1916 |
| 1,583,391 | Cook | May 4, 1926 |
| 1,753,501 | Christensen | Apr. 8, 1930 |
| 2,290,217 | Trindl et al. | July 21, 1942 |
| 2,605,068 | Longenberger | July 29, 1952 |
| 2,610,348 | Jenkins | Sept. 16, 1952 |